March 6, 1962  K. B. SORENSEN ETAL  3,023,718
DEPTH REGULATING MEANS FOR A FURROW OPENER
Original Filed July 19, 1956
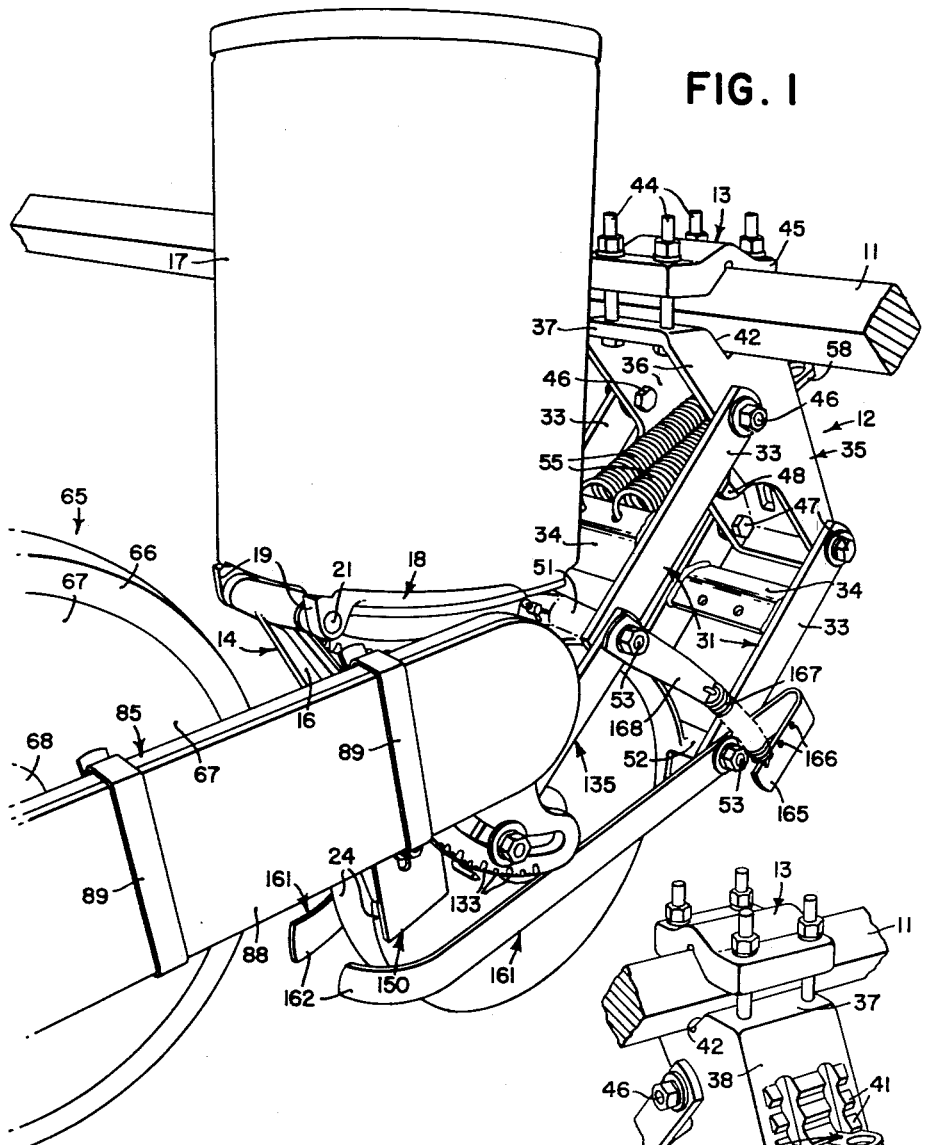
FIG. 1
FIG. 2
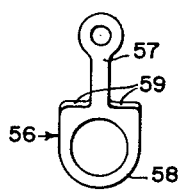
FIG. 3
INVENTORS.
KNUD B. SORENSEN
ARTHUR J. BJERKAN
BY
Roger C. Johnson
ATTORNEYS

United States Patent Office 3,023,718
Patented Mar. 6, 1962

1

3,023,718
DEPTH REGULATING MEANS FOR A FURROW OPENER
Knud B. Sorensen, Rock Island, and Arthur J. Bjerkan, Moline, Ill., assignors, by mesne assignments, to Deere & Company, a corporation of Delaware
Original application July 19, 1956, Ser. No. 598,854. Divided and this application Oct. 25, 1957, Ser. No. 692,415
4 Claims. (Cl. 111—85)

This application is a division of our copending application, Ser. No. 598,854, filed July 19, 1956, for Unit Type Planter.

The present invention relates generally to agricultural implements and more particularly to planting means of the unit type, of which a plurality of such units are usually attached to a transversely disposed tool bar or other support mounted on a tractor or the like.

The object and general nature of the present invention is the provision of new and improved mounting means by which a seed boot and associated parts are connected with the toolbar or other support through mechanism that provides for an adjustable amount of down pressure, whereby to insure the desired penetration of the furrow opening means, and/or compaction of soil around seed, and it is also a feature of this invention to provide new and improved spring means whereby the effective amount of down pressure may readily be adjusted by an operator without the use of any tools, levers or the like.

These and other objects and advantages of the present invention will be apparent to those skilled in the art after a consideration of the following detailed description, taken in conjunction with the accompanying drawings, in which:

FIG. 1 is a perspective view of a toolbar mounted unit planter incorporating the principles of the present invention.

FIG. 2 is a fragmentary perspective view showing the toolbar supported bracket by which the planting unit is connected to the supporting toolbar.

FIG. 3 is a detail view of one of the spring adjusting parts.

Referring first to FIG. 1, the planting unit is shown as detachably mounted on a toolbar 11 that is conventionally carried at the rear of a tractor for receiving a plurality of planting units. Preferably, the toolbar 11 is square in cross section and arranged on the tractor with the bar in a diagonal disposition, one edge of the bar being disposed in an uppermost position and the opposite edge in a lowermost position. The planting unit includes a mounting bracket 12 secured to the toolbar or support 11 by clamp means 13, and the planting means includes a furrow opener boot 14, preferably in the form of a casting having a rear extension 16 adapted to hingedly receive a hopper 17 in which conventional seed selecting means is disposed. Preferably, the hopper 17 includes a hopper bottom 18 having lugs 19 that are apertured to receive a hinge pin 21 that, when the hopper 17 is mounted in position on the furrow opener boot, is disposed in a notched opening formed in the rear portion of the furrow opener boot extension 16. The latter also includes a lower bearing section on which a pair of disk furrow openers 24 are mounted for rotation, as by conventional bearing means. A seed passageway at the upper portion of the furrow opener boot 14 receives seed from the dispensing

2 means of the hopper 17 and conducts the seed downwardly into the furrow opened by the disks 24.

The furrow opener boot 14 and associated parts, including the hopper 17, are mounted for relatively free floating movement with respect to the support or toolbar 11, and to this end, a pair of parallel link units 31 are provided for swingably connecting the furrow opener boot 14 with the mounting bracket 12. Each of the link units 31 comprises a pair of spaced apart bars 33 held in spaced apart relation by a strut 34 securely fixed, as by welding, at its ends to the associated links 33. The mounting bracket 12 comprises, in general, a channel-like part 35 having sides 36, an upper wall portion 37 and a forward wall portion 38, the latter being provided with a pair of vertical slots 39 and transverse ribs 41 for a purpose that will be referred to later. The spaces between the ribs 41 form notches. The upper face 37 is provided with V-shaped notches 42 that, as best shown in FIG. 1, are adapted to engage the lower surfaces of the toolbar 11, and the upper face 37 of the mounting bracket is also provided with a plurality of bolt-receiving openings in which a plurality of fasteners 44, extending upwardly through a clamping cap 45, are received. When the fasteners 44 are tightened, the mounting bracket 12 is securely fixed to the toolbar or support 11. The side portions 36 of the mounting bracket 12 are apertured to receive pivot means 46 and 47 by which the forward portions of the link units 31 are connected with the bracket 12 for generally vertical swinging movement. The side portions 36 are provided with outwardly and rearwardly disposed extensions or lugs 48 that are located so as to engage the forward portions of the links 33 of the upper link unit 31, serving thereby as stops for limiting the downward swinging of the upper link unit 31 and hence limiting the downward movement of the furrow opener boot 14 and associated parts. To provide means to receive the rear portions of the parallel link units 31, the furrow opener boot 14 is provided with upper and lower transverse tubular extensions 51 and 52 by which pivot bolt means 53, extending through the rear apertured ends of the upper and lower links 33 and through associated bushings, swingably mount the furrow opener boot 14 and associated parts on the rear or lower ends of the parallel link units 31.

Spring means are provided for applying an adjustable amount of down pressure so as to force the furrow opening disks 24 into the ground, and provision is made whereby the amount of down pressure exerted may be adjusted by the operator without the use of any tools, levers or the like, although in some cases a relatively large amount of down pressure may be required. For this purpose, a pair of springs 55 are connected between the upper link unit 31 and the mounting bracket 12. Each of these springs is indicated by the reference numeral 55, and the rear ends of the springs 55, as can best be seen in FIG. 1, are hooked into openings formed in the upper strut 34. The forward end of each spring 55 receives the rear portion of a spring anchoring member 56, and each of these members includes a narrow eyed portion 57 (FIG. 3) that extends through the associated slot 39, being formed at its forward end with manually engageable means in the form of a finger hole portion 58 and associated shouldered portions 59, the shouldered portions 59 are adapted to lie in the notches between selected ribs 41, the mounting bracket 12 being so shaped that a greater spring pressure is exerted when the eye member 56 engages in the lower ribbed portions of the bracket. The tension of the springs 55 may be individually adjusted manually, and two springs are provided, rather than a single spring, so that an operator may more readily adjust the springs to different positions, as desired, even to the positions where relatively substantial forces are exerted, because the springs may be adjusted one at a time, and therefore less force need be exerted by the operator than would be the case if he were required to adjust a single relatively strong spring. Also, by having two springs, a relatively finer adjustment may be secured since one spring may be adjusted along the forward face of the mounting bracket to a position slightly different from that to which the other spring is brought.

The press wheel, which is indicated in its entirety by the reference numeral 65, is employed, not only to firm the soil about the planted seed, but also to determine or control the depth of operation and, additionally, to drive the seed dispensing means that forms a part of the planting unit. The press wheel 65 includes a rubber or flexible tread section 66, a web section 67, and a hub section 68 that is secured in any suitable way, as by a press fit, to one end of a press wheel shaft that is journaled in the rear portion (not shown) of a combined arm and chain housing 85.

The support 85 preferably takes the form of a rigid generally longitudinally extending chain drive housing having a back wall and a continuous flange forming side walls to which a housing cover 88 is adapted to be fixed, as by spring fasteners 89. An arcuate extension of the arm 85 carries graduations 133 with which an arm-adjusting link 135 cooperates, as explained in detail in our patent application identified above. Scraper means for the disks 24 are indicated at 150.

A pair of covering arms 161 are provided at each side of the associated furrow opening disks 24. Each covering arm 161 includes a rear laterally inwardly directed curved section 162 that scrapes adjacent soil into the furrow opened by the disks 24 so as to partially cover the seed deposited therein. Each covering arm is pivotally mounted on the boot member 14 preferably at the same point as the lower parallel link unit 31. The forward end of each of the covering arms 161 is bent outwardly and rearwardly, as indicated at 165 (FIG. 1), and is provided with a plurality of openings 166 to receive the lower end of an associated tension spring 167, the holes 166 being at different distances from the pivot axis defined by the bolt 53. At its upper end, each of the tension springs 167 is connected to an anchoring link 168 that is rigidly fixed to the boot castings 14 by the upper connecting bolt 53.

In operation, the tension spring 167 applies upward pressure to the front end of the associated cover arm 161 and thereby causes the rear end of the cover arm 161 to press downwardly in a yielding fashion against the soil. When the toolbar 11 is raised for transport, the entire unit is raised upwardly, but the downward movement of the planting unit is limited by contact of the upper parallel link unit 31 with the stops 48. To limit undesired downward movement of the rear ends of the cover arms 161 when the planting unit is raised off the ground, the tension springs 167 are so arranged that after a small amount of downward swinging of the arms 161, the springs 167 become fully compressed and then serve as stops acting between the anchors 168 and the forward ends of the cover arms 161, thus preventing any further downward movement of the rear ends of the latter.

While we have shown and described above the preferred structure in which the principles of the present invention have been incorporated, it is to be understood that our invention is not to be limited to the particular details, shown and described above, but that, in fact, widely different means may be employed in the practice of the broader aspects of our invention.

What we claim, therefore, and desire to secure by Letters Patent is:

1. A planting unit adapted for toolbar mounting, comprising a furrow opener boot, a mounting bracket comprising a channel-like part having spaced apart side portions and a forward wall portion, the latter portion having a pair of generally vertical slots therein arranged in laterally spaced apart relation between said side portions and transverse ribs arranged adjacent said slots, parallel link means connecting said boot with the side portions of said bracket, a pair of biasing spring means connecting certain of said links with said mounting bracket for urging said boot downwardly, and a pair of adjustable anchoring means receiving said pair of spring means and movably disposed in said slots, each of said anchoring means including laterally extending projections disposable selectively between selected ribs.

2. A planting unit adapted for tool bar mounting, comprising a furrow opener boot, a generally vertical mounting bracket adapted to be fixed to said toolbar and having a generally vertically extending portion provided with a pair of generally vertically extending slots therein, generally parallel upper and lower link means pivotally connected at their upper ends with side portions of said mounting bracket and extending downwardly at an angle therefrom, means pivotally connecting the lower ends of said link means with said boot, and adjustable spring means connecting said link means and said mounting bracket, comprising a pair of springs disposed normally in side by side relation and each having one end connected to the upper of said links, a spring anchoring member extending through each of said slots and having its inner end connected with the other end of the associated spring, manually engageable means on the outer end of each spring anchoring member to faciliatte shifting the spring anchoring member to different positions in the associated slot in the mounting bracket for manually changing the effective tension exerted by the associated spring, and means on said mounting bracket releasably retaining each spring anchoring member in its selected position of adjustment.

3. The invention defined in claim 2, further characterized by said releasable retaining means comprising notches formed in the outer face of said mounting bracket adjacent said slots and portions on each spring anchoring member engageable in said notches.

4. A planting unit adapted for toolbar mounting, comprising a furrow opener boot, a mounting bracket having laterally spaced apart side portions, clamp means on said bracket for attaching the latter to a toolbar, pairs of generally parallel downwardly and rearwardly extending upper and lower links connecting said boot for generally up and down movement with the side portions of said bracket, a transverse strut connected at its ends rigidly to the links of said upper pair, said strut having a pair of laterally spaced apart apertures, a pair of springs disposed side by side between the links of said upper pair and engaged at one end in the apertures of said strut, a pair of generally vertical slots formed in said mounting bracket between said side portions thereof, a pair of spring-anchoring members connected, respectively, with the forward ends of said springs and each anchoring member being individually adjustable along the associated slot so as to increase or decrease the effective tension exerted by the associated spring, the end of each anchoring member extending through the associated slot and being disposed at the side of said bracket opposite said springs and having means on the extending end of the anchoring member adapted to be engaged manually to effect adjustment of the spring anchoring member in the associated slot, and means on said mounting bracket adjacent said slots releasably retaining each spring anchoring member in its selected position of adjustment.

References Cited in the file of this patent

UNITED STATES PATENTS

| | | |
|---|---|---|
| 310,584 | Hamilton | Jan. 13, 1885 |
| 1,114,940 | Trompeter | Oct. 27, 1914 |
| 1,300,277 | Johnston | Apr. 15, 1919 |
| 1,696,562 | Allen | Dec. 25, 1928 |
| 1,838,535 | Dattisman | Dec. 29, 1931 |
| 1,851,196 | Lewis | Mar. 29, 1932 |
| 1,902,924 | Wamhoff | Mar. 28, 1933 |
| 1,927,153 | Conrader | Sept. 19, 1933 |
| 2,249,874 | White | July 22, 1941 |
| 2,328,174 | Silver | Aug. 31, 1943 |
| 2,554,061 | Sandberg | May 22, 1951 |
| 2,698,114 | Buhr | Dec. 28, 1954 |
| 2,789,736 | Agnoletto | Apr. 23, 1957 |

OTHER REFERENCES

Ser. 254,631, De Visart, (A.P.C.), published May 11, 1943.